United States Patent [19]

Castoe

[11] 4,373,240
[45] Feb. 15, 1983

[54] METHOD FOR REMOVING CAM SHAFT SPROCKET

[76] Inventor: John H. Castoe, 10234 McVine St., Sunland, Calif. 91040

[21] Appl. No.: 299,610

[22] Filed: Sep. 4, 1981

Related U.S. Application Data

[60] Continuation of Ser. No. 146,470, May 5, 1980, abandoned, which is a division of Ser. No. 871,817, Jan. 24, 1978, Pat. No. 4,218,939.

[51] Int. Cl.³ .......................... B23P 6/00; B23P 15/00
[52] U.S. Cl. ............................ 29/156.4 R; 29/402.03; 29/426.1; 29/559; 29/281.6; 269/50; 269/60
[58] Field of Search ...................... 29/156.4 R, 402.01, 29/402.03, 426.1, 559, 281.1, 281.6, 402.08, 253, 244; 123/1 R; 269/60, 50, 47, 909; 81/1 R, 3 R, 3 K, 3.7; 254/100

[56] References Cited

U.S. PATENT DOCUMENTS

| 1,504,931 | 8/1924 | Blasezyk | 269/47 |
|---|---|---|---|
| 1,638,789 | 8/1927 | Weaver | 81/3 R |
| 1,937,833 | 12/1933 | Mondloch | 157/17 |
| 2,536,614 | 1/1951 | Syracusa | 269/60 |
| 2,556,024 | 6/1951 | Bourdon et al. | 157/1.24 |
| 2,587,139 | 2/1952 | Glover | 29/253 |
| 2,599,102 | 6/1952 | Gilreath | 254/100 |
| 3,727,490 | 4/1973 | Diffenderfer et al. | 81/3 K |
| 3,832,764 | 9/1974 | Fletcher et al. | 29/253 |

Primary Examiner—Daniel C. Crane
Attorney, Agent, or Firm—Christie, Parker & Hale

[57] ABSTRACT

A cylinder head is removed from an overhead cam engine by first inserting a timing chain support tool between opposed portions of the timing chain so that opposite edges of the tool support the chain above the crankshaft sprocket. A movable finger at the bottom of the tool can be moved outwardly to apply pressure against the normal bias of the chain tensioner, which prevents the timing chain from slipping off the crankshaft sprocket while the upper cam shaft sprocket and the cylinder head are removed. The engine can be cranked with the cylinder head removed by mounting a cam shaft idler tool on the engine block for supporting the cam shaft sprocket. The timing chain is engaged with the cam shaft sprocket and a slide member of the idler tool can move the cam shaft sprocket until it applies tension to the timing chain. The movable finger which opposes the timing chain tensioner can be actuated to release pressure on the tensioner so that the tensioner can engage the timing chain, allowing the engine can be cranked.

2 Claims, 11 Drawing Figures

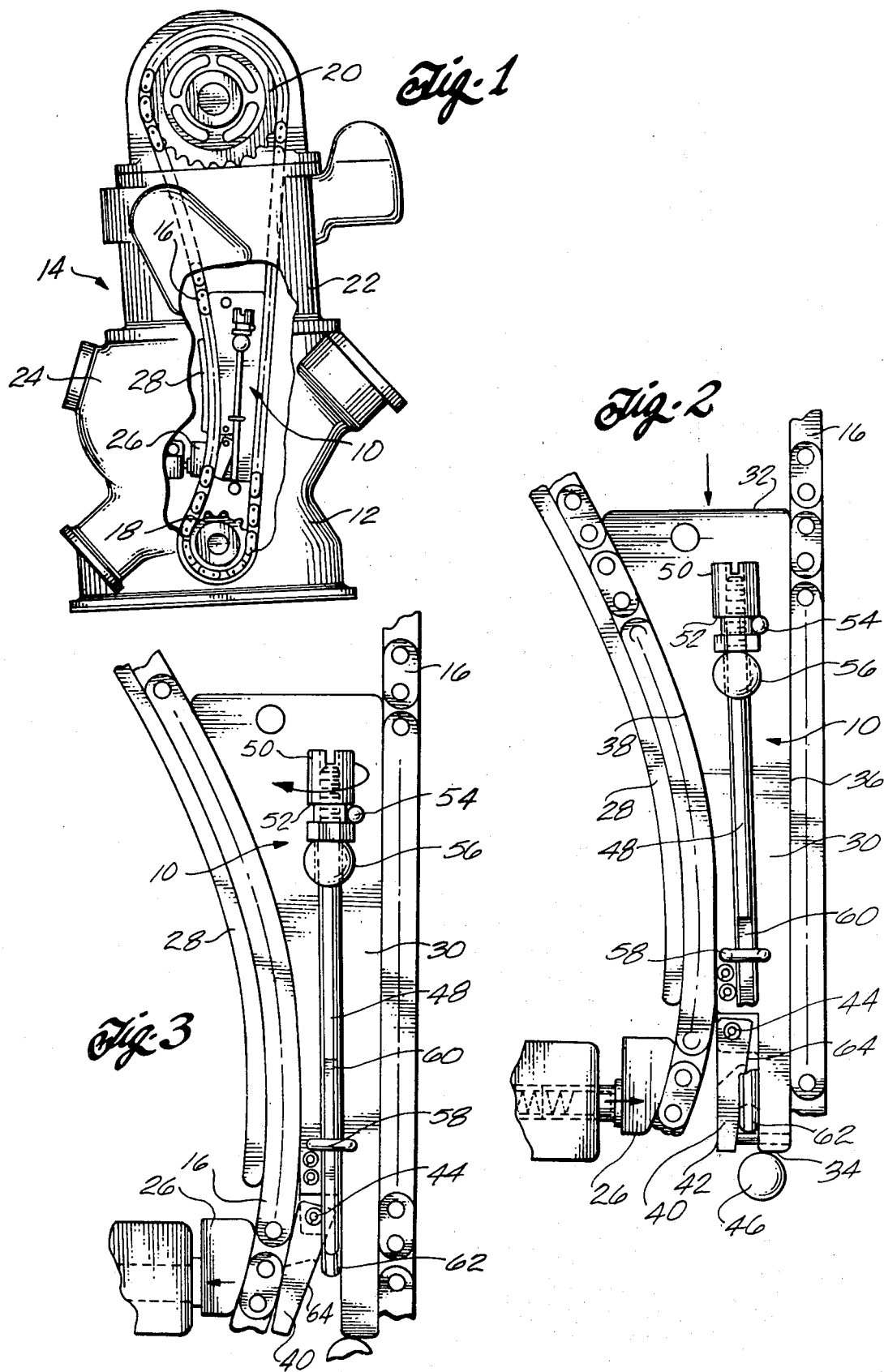

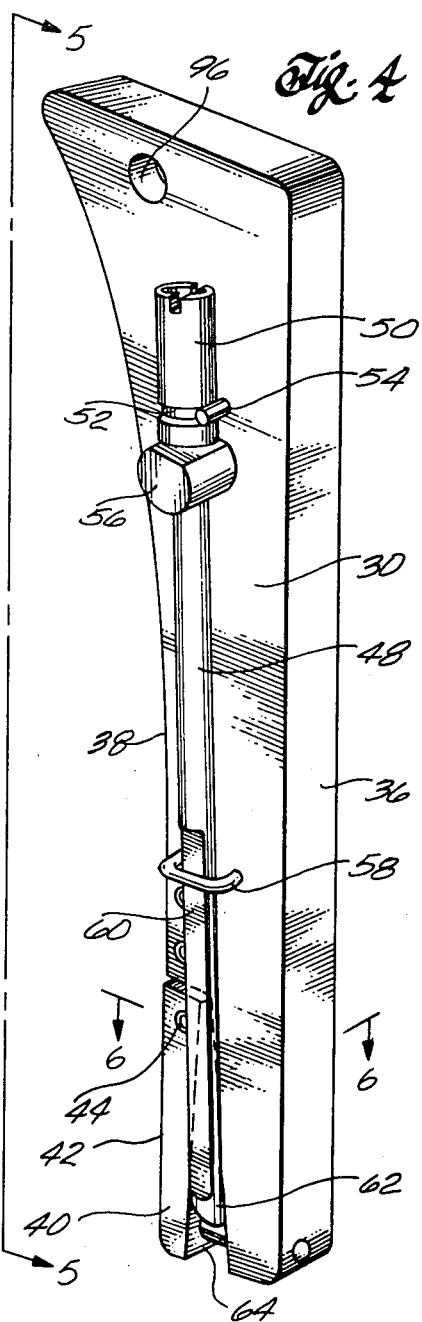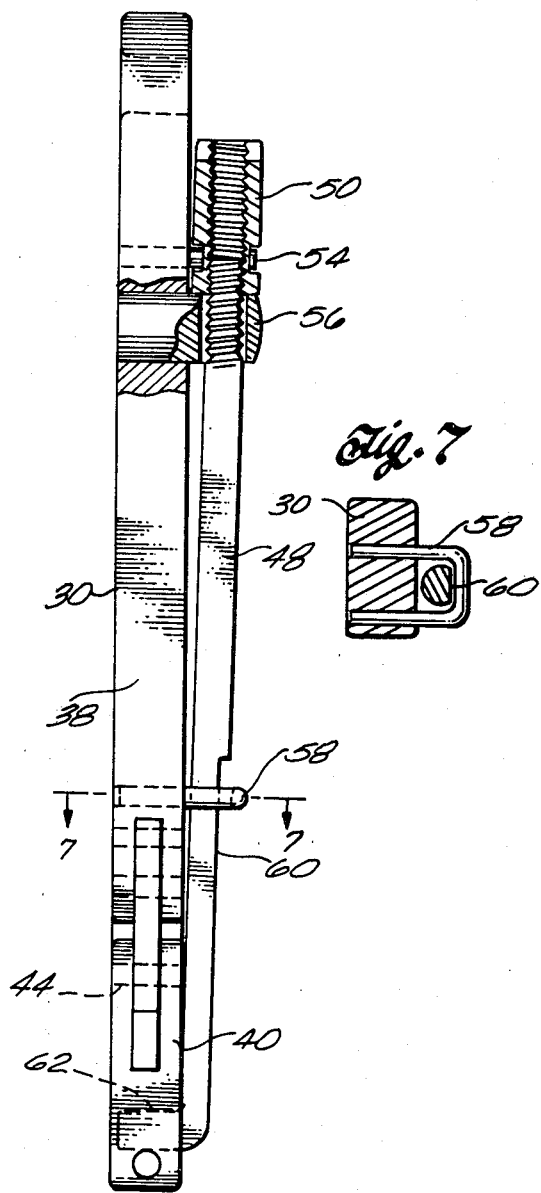

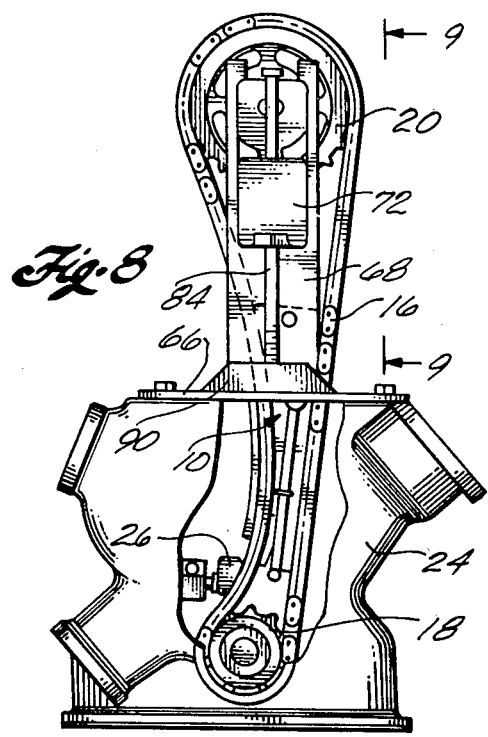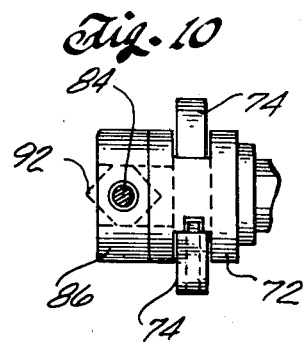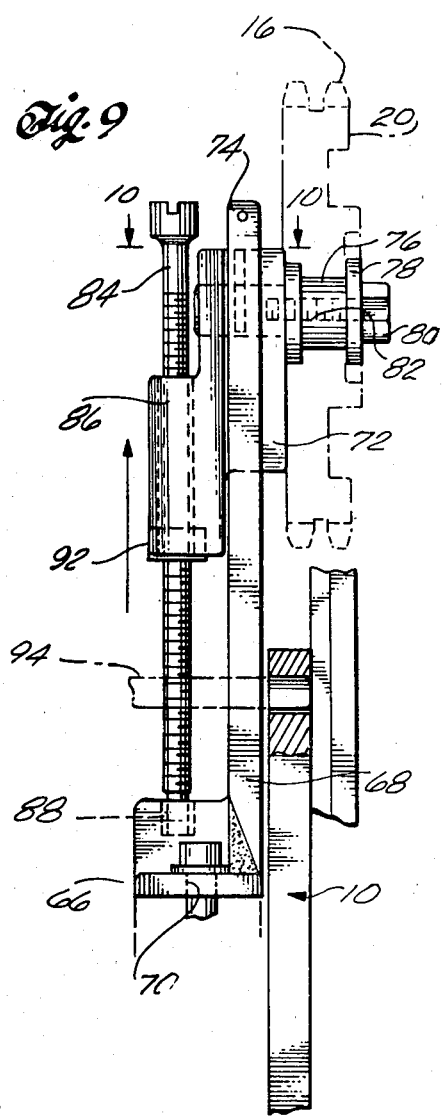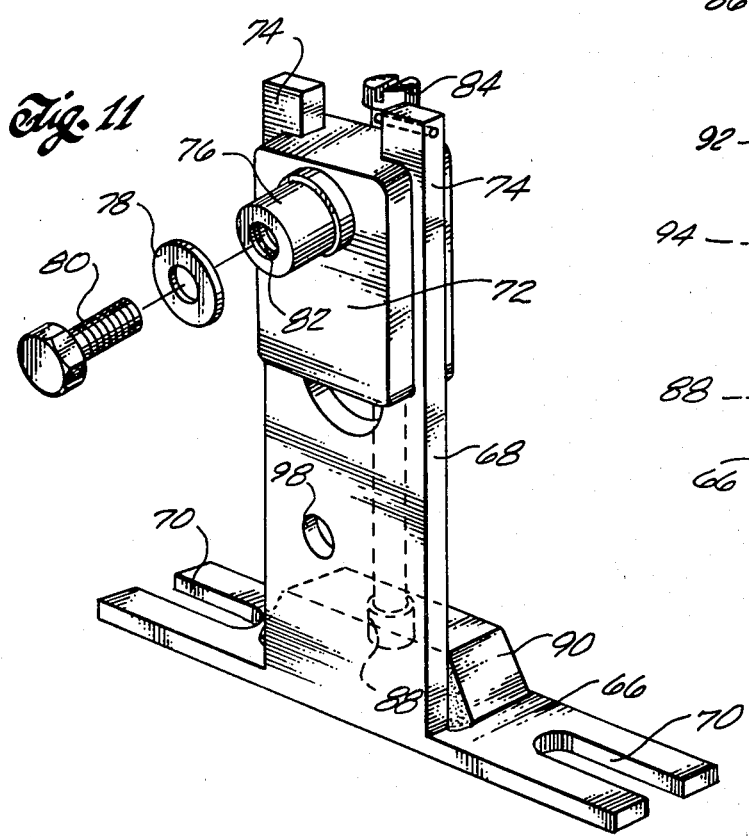

METHOD FOR REMOVING CAM SHAFT SPROCKET

This is a continuation of application Ser. No. 146,470, filed May 5, 1980, abandoned, which in turn is a division of Ser. No. 871,817, filed Jan. 24, 1978, now U.S. Pat. No. 4,218,939.

BACKGROUND

This invention provides tools for facilitating removal of a cylinder head of an overhead cam engine and for facilitating cranking of the engine when the cylinder head is removed.

The job of overhauling an automobile engine is time-consuming and costly to the automobile owner. The job of disassembling and reassembling certain automobile engines is especially tedious and time-consuming when there are no tools available to aid the repairman in accomplishing certain necessary steps in the repair process. For example, to remove the cylinder head of an overhead cam engine manufactured by Nissan Motor Company, Ltd., Tokyo, Japan (Datsun), or other similar engines, the timing chain is initially removed to free the cam shaft sprocket. The sprocket is then removed so that the cylinder head can be removed. The timing chain must be supported while the cam shaft sprocket is removed to prevent the timing chain from slipping off the crankshaft sprocket. Service manuals for such an engine recommend placing a wood block in the timing chain housing to support the timing chain on the crankshaft sprocket. Often a repairman will make such a wood block to hopefully match the approximate dimensions of the space above the crankshaft sprocket between opposite portions of the timing chain. Such a device has proved very unreliable in holding the timing chain on the crankshaft sprocket. A chain tensioner in the lower portion of the timing chain housing normally applies spring loaded tension against the side of the timing chain. If there is any slack in the chain, the chain tensioner will pop the chain off the crankshaft sprocket. When such a wood block is inserted into the timing chain housing it often leaves too much slack on the timing chain and the chain tensioner pops the chain off the crankshaft sprocket. Once the timing chain is lost, a substantial amount of additional labor is required. This can require removal of the timing chain cover, the radiator, water pump, and smog control equipment in order to obtain access for replacing the tensioner in its proper position and properly aligning the timing marks for the timing chain.

When the wood block is in place in the timing chain housing, the engine cannot be cranked or the timing chain will slip off the crankshaft sprocket. It is necessary to crank the engine when removing the pistons from the engine block in order to obtain access to the piston connecting rods and the rod bearings. It is common practice for repairmen to remove the engine block from the vehicle to obtain access to the piston connecting rods and the rod bearings.

The present invention provides a tool which can be inserted into the timing chain housing for supporting the timing chain while the cam shaft sprocket is removed. The tool can be actuated to oppose the normal bias of the chain tensioner so that the chain tensioner will not tend to pop the timing chain off the crankshaft sprocket while the timing chain is being supported.

The present invention also provides a cam shaft idler tool for supporting the cam shaft sprocket after the cylinder head has been removed. The cam shaft idler supports the cam shaft sprocket on the timing chain and allows the engine to be cranked, while preventing the timing chain from slipping off the crankshaft sprocket. Thus, the repairman can crank the engine to obtain access to the piston connecting rods and rod bearings while the cylinder head is removed and without requiring removal of the engine block.

SUMMARY OF THE INVENTION

Briefly, a tool for use in removing a cam shaft sprocket from an overhead cam engine includes an elongated body having a width which tapers narrower along the lengthwise extent of the body. The body tapers narrower from a first relatively wider end toward a second relatively narrower end. The taper allows the body to be inserted into a correspondingly tapered space between opposed sides of an endless timing chain adjacent a crankshaft sprocket. A cam shaft sprocket above the crankshaft sprocket is engaged with the timing chain, and a chain tensioner applies tension to the side of the chain adjacent the crankshaft sprocket. An elongated finger, normally forming a portion of the relatively narrower second end of the body, is movably secured to the body. The finger can be selectively activated for moving it between a normal position, forming a portion of the relatively narrower second end of the body, and an operative position in which the finger is held in a fixed position spaced apart from the body for enlarging the width of the second end of the body. The body can be inserted into the tapered space between portions of the timing chain adjacent the crankshaft sprocket when the finger is in its normal position. The finger can be thereafter actuated to move to its operative position to be held in such position to constantly apply pressure against the normal bias of the chain tensioner. The body has opposed edges which support the opposed portions of the timing chain adjacent the crankshaft sprocket. The finger applying pressure against the normal bias of the chain tensioner keeps the timing chain tightly secured to the crankshaft sprocket so that the timing chain will not slip off the sprocket.

The invention also includes a cam shaft idler tool for supporting a cam shaft sprocket in a fixed position in which a timing chain engaged with the sprocket can be held taut around the sprocket. The idler tool comprises a support platform having an elongated upright support member and a slide member for sliding lengthwise along the support member. A hub projects from a face of the slide member for supporting the cam shaft sprocket. The slide can be actuated for moving the slide member and the hub lengthwise with respect to the support member for applying tension to a chain engaged with the sprocket carried on the hub. The cam shaft sprocket thus can be supported with the timing chain engaged with it and being sufficiently in tension around the crankshaft sprocket so that the engine can be cranked while the cylinder head is removed. This facilitates removal of the pistons from the engine block without requiring the removal of the engine block from the vehicle.

These and other aspects of the invention will be more fully understood by referring to the following detailed description and the accompanying drawings.

DRAWINGS

FIG. 1 is a front elevation view, partly broken away, showing a timing chain support tool according to the principles of this invention;

FIG. 2 is a fragmentary elevation view showing the tool of FIG. 1 in a normal position;

FIG. 3 is a fragmentary elevation view showing the tool of FIG. 2 in an operative position applying pressure against a chain tensioner;

FIG. 4 is a perspective view of the tool shown in FIGS. 2 and 3;

FIG. 5 is an end elevation view, partly in cross-section and partly broken away, taken on line 5—5 of FIG. 4;

FIG. 6 is a cross-sectional view taken on line 6—6 of FIG. 4;

FIG. 7 is a cross-sectional view taken on line 7—7 of FIG. 5;

FIG. 8 is a front elevation view, partly broken away, showing a cam shaft idler tool according to the principles of this invention supporting a cam shaft sprocket;

FIG. 9 is an elevation view, partly in cross-section and partly broken away, taken on line 9—9 of FIG. 8;

FIG. 10 is a cross-sectional view taken on line 10—10 of FIG. 9; and

FIG. 11 is a partly exploded perspective view showing the cam shaft idler tool.

DETAILED DESCRIPTION

FIG. 1 shows a chain support tool 10 for being inserted into the space inside a timing gear housing 12 of an overhead cam engine 14. The chain support tool is inserted between opposed portions of an endless timing chain 16 above a crankshaft sprocket 18. An upper portion of the timing chain 16 is engaged with a cam shaft sprocket 20 at the end of a cylinder head 22 which rests on an engine block 24. A lower portion of the timing chain 16 is engaged with the crankshaft sprocket 18. A spring-loaded chain tensioner 26 inside the timing chain housing applies lateral pressure to the timing chain below a chain guide 28 for keeping the timing chain taut around the upper and lower sprockets during operation of the engine.

The detailed structure of the chain support tool 10 is illustrated in FIGS. 2 through 7. The tool includes a body 30 having a relatively wider first end 32 and a relatively narrower second end 34. The width of the body progressively tapers narrower from the first end 32 toward the second end 34. The body has opposed first and second flat edges 36 and 38, respectively, extending along the lengthwise extent of the body between the first end and the second ends of the body. The first edge 36 is straight and provides means for supporting a corresponding straight portion of the timing chain 16 above the right side of the crankshaft sprocket as viewed in FIGS. 1 through 3. The opposite second edge 38 of the body has a curved taper for supporting a correspondingly curved tapered shape of the timing gear chain above the left side of the crankshaft sprocket as viewed in FIGS. 1 through 3. The chain tensioner 26 normally applies spring loaded pressure to the left side of the timing gear chain above the crankshaft sprocket 18.

A movable finger 40 forms a portion of the narrower second end of the body. The finger is located on the side of the body below the curved tapered second edge 38 of the body. The finger has an outside edge 42 which is substantially coincident with and essentially forms a continuous extension of the second edge 38 of the body, when the finger 40 is in a normal position, shown in FIG. 2. When the finger 40 is in its normal position, the width of the body adjacent the second end 34 is sufficiently narrow to allow the lower portion of the body to be slipped downwardly into the space between opposed portions of the timing gear chain above the crankshaft sprocket 18. This space is relatively narrow because of the normal spring pressure being exerted on the timing chain 16 by the chain tensioner 26. The body of the tool can be slipped into this space so that the finger 40 is located on the side of the chain opposite the spring tensioner 26, as shown in FIG. 2. A pin 46 in the timing chain housing provides a stop for the lower end 34 of the tool.

Once the chain support tool is positioned as shown in FIG. 2, the finger 40 can be actuated to move laterally away from the body 30 of the tool and toward the chain tensioner 26 to apply pressure against the normal bias of the chain tensioner spring. The finger 40 pivots about a transverse axis parallel to the opposed edges 36,38 of the tool. An upper portion of the finger is hinged to a lower portion of the body 30 by a pivot pin 44 which allows a lower portion of the finger 40 to pivot laterally away from the remaining portion of the body 30.

The finger 40 is actuated by an elongated actuating rod 48 which extends lengthwise along the body 30 of the tool. The rod 48 can be located in an internal bore (not shown) extending through the body, or it can be located on a face of the body as shown in the drawings. In the embodiment shown, an internally threaded adjustment nut 50 is threaded onto an externally threaded upper portion of the rod 48. The adjustment nut has an exterior recess 52 extending around it, and a fixed pin 54 projecting from the face of the body 30 rides in the recess 52 for holding the adjustment nut in a fixed position while rotation of the adjustment nut about its axis can raise or lower the rod 48 with respect to the face of the body 30. An upper portion of the rod extends through a bore in a support 56 projecting from the face of the body 30 for holding the rod in a fixed position with respect to the body. A lower portion of the rod extends through a U-shaped support member 58 engaged with a flat relief surface 60 on the rod for preventing the rod from rotating about its axis. The bottom of the rod 48 is curved to form a detent 62 which projects into a space between the body 30 and an adjacent inside face 64 of the finger 40.

In use, the adjustment nut 50 can be rotated about its axis so as to linearly raise the rod 48 with respect to the body 30. This causes the detent 62 to ride upwardly in the space between the lower portion of the body and the finger 40. Since the inside face 64 of the finger tapers wider toward the axis of the pivot pin 44, continued upward movement of the detent in this space causes the finger to pivot outwardly about the pivot pin into the operative position shown in FIG. 3. In this position, the finger can apply pressure to the chain tensioner 26 in opposition to the normal bias of the tensioner spring to push the spring away from the timing chain 16. The detent 62 can be constantly maintained in a position holding the finger in its operative position so as to constantly oppose the bias of the chain tensioner spring. This constantly squeezes the timing chain 16 between the finger 40 and the spring tensioner 26 and aids in holding the chain on the crankshaft sprocket 18. Moreover, the normal bias of the chain tensioner is opposed, so the normal spring pressure of the tensioner is not available to pop the chain off the crankshaft sprocket, when there is slack in the chain. Further, the opposite edges of the tool support opposed portions of the timing chain above the crankshaft sprocket and therefore the cam shaft sprocket and cylinder head can be removed without the timing chain slipping from the crankshaft sprocket.

FIGS. 8 through 11 show a cam shaft idler tool for supporting the cam shaft sprocket 20 after the cylinder head 22 has been removed. This tool can be used in conjunction with the chain support tool 10 for providing a means for cranking the engine when the cylinder head is removed. As described above, the chain support tool 10 is used to support the timing chain on the crankshaft sprocket 18 while the cam shaft sprocket 20 and cylinder head 22 are removed. If the pistons should be removed, the cam shaft idler tool can be used to support the cam sprocket 20 independently of the cylinder head so that the engine can be cranked for providing access to the piston connecting rods and rod bearings for removing each of the pistons. This enables the repairman to remove the pistons relatively quickly without the added time and expense of pulling the engine block from the vehicle.

The cam shaft idler tool includes a platform having a flat base 66 and an elongated upright support member 68 projecting perpendicularly above the plane of the base 66. The base 66 includes slots 70 for use in releasably securing the base to a portion of the engine block 24, as shown in FIG. 8. In this position, the support member 68 extends uprightly adjacent the location normally occupied by the cam shaft sprocket 20.

A slide member 72 rides up and down on the support member 68. The slide member 72 comprises a block which fits between uprights 74 on opposites sides of the support member 68. The opposite edges of the block are slotted linearly, and the uprights 74 fit into the slots to allow the block to slide linearly with respect to the upright extent of the support member 68.

A cylindrical hub 76 projects from a face of the slide member 72 shown in FIG. 11. The cam shaft sprocket 20 can slip over the hub 76 to provide an axial idler bearing for rotating the cam shaft sprocket relative to the hub. A plate 78 which is oversized with respect to the outside diameter of the hub 76 overlies the outer face of the hub 76, and a bolt 80 can be threaded into a cooperating internally threaded bore 82 in the hub 76 for securing the sprocket to the hub 76.

An elongated upright adjustment rod 84 extends through a projecting portion 86 of the slide member on a side of the upright support member 68 opposite the hub 76. The adjustment rod 84 has a foot carried in an upwardly facing recess 88 in a raised portion 90 of the base 66. The projecting portion 86 of the slide member projects above the recess and carries a fixed adjustment nut 92 having an internally threaded bore. The adjustment rod 84 is threaded through the bore of the adjustment nut 92. The adjustment rod 84 can be rotated about its axis which will cause the slide member 72 to move linearly up or down along the adjustment rod, depending upon the direction of rotation of the rod.

In using the cam shaft idler tool, the tool can be positioned, as shown in FIG. 8, by securing its base 66 atop the engine block 24 adjacent the normal position of the cam shaft sprocket 20. The timing chain 16 can be reeved over the cam shaft sprocket 20 and the cam shaft sprocket can be secured to the hub 76. At this point, the tension in the timing chain is slack, but the chain support tool 10 holds the timing chain in place around the crankshaft sprocket 18. The adjustment rod then is rotated on its axis to raise the slide member 72 which, in turn, raises the cam shaft sprocket 20 relative to the engine block to apply tension to the chain 16. The chain support tool 10 can be supported by a support pin 94 which extends through a passage 96 in the body 30 of the tool and a corresponding passage 98 in the support member 68 of the cam shaft idler tool. Once sufficient tension is applied to the timing chain, the adjustment rod 48 of the chain support tool can be actuated to pivot the finger 40 back to its normal position to relieve pressure on the chain tension 26. The normal tension in the timing chain is then returned and the engine can be cranked. By rotating the crankshaft, the connecting rods and rod bearings for each of the pistons can be exposed for removing the pistons without having to remove the engine block 24 from the vehicle.

What is claimed is:

1. A method for facilitating removal of an engine cylinder head and for facilitating cranking of the engine when the cylinder head is removed, wherein the engine includes an upper cam shaft sprocket, a lower crankshaft sprocket below the cam shaft sprocket, an endless timing chain engaged with both sprockets and forming a narrow space between opposite sides of the chain adjacent the crankshaft sprocket, and a chain tensioner urged against the portion of the timing chain adjacent the crankshaft sprocket, the method comprising the steps of:

providing a chain support tool having a rigid body, a movable finger in a normal position adjacent a lower portion of the rigid body, and finger actuating means for moving the finger outwardly from the normal position to an operative position enlarging the effective width of the lower portion of the rigid body;

inserting the chain support tool into said narrow space between the opposite sides of the timing chain, with the finger in its normal position, so the rigid body supports the opposite sides of the timing chain adjacent the crankshaft sprocket;

operating the finger actuating means for moving the finger outwardly to its operative position to apply pressure against the normal bias of the chain tensioner for retaining the timing chain on the crankshaft sprocket;

removing the cam shaft sprocket and the engine cylinder head;

providing a cam shaft idler tool having a hub for supporting the cam shaft sprocket, a post for supporting the hub, and means for securing the hub in a selected fixed position on the post;

supporting the cam shaft sprocket on the hub;

securing the post in a fixed position; and moving the hub to a selected fixed position on the post so the sprocket thereon applies tension to the timing chain, so the engine can be cranked, in the absence of the cylinder head, owing to the tension of the timing chain.

2. The method according to claim 1 including the step of operating the finger actuating means after the chain is tensioned to release pressure from the finger against the chain tensioner, and thereafter cranking the engine.

* * * * *